Dec. 17, 1957     R. R. LAYTE ET AL     2,816,665
WOUND FILTER ELEMENT
Filed Aug. 16, 1954     3 Sheets-Sheet 1
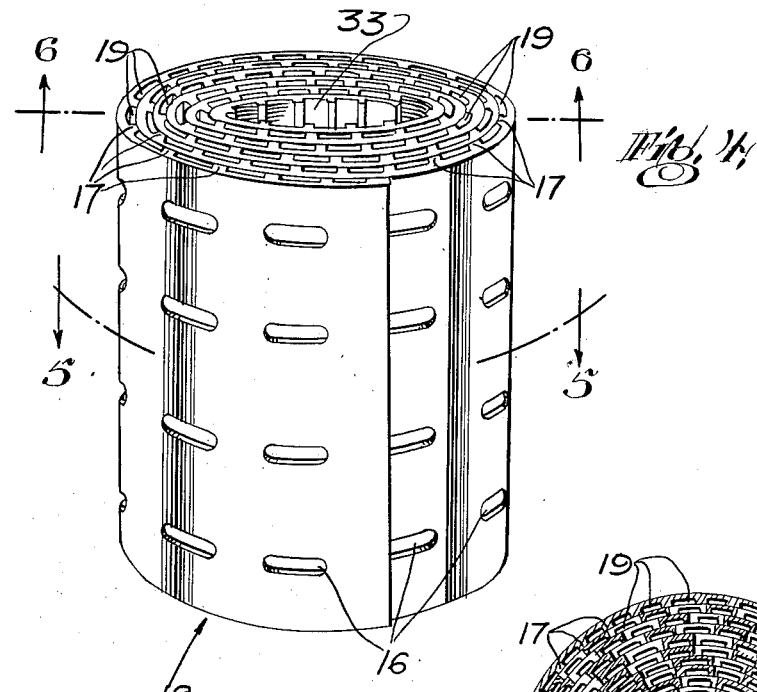
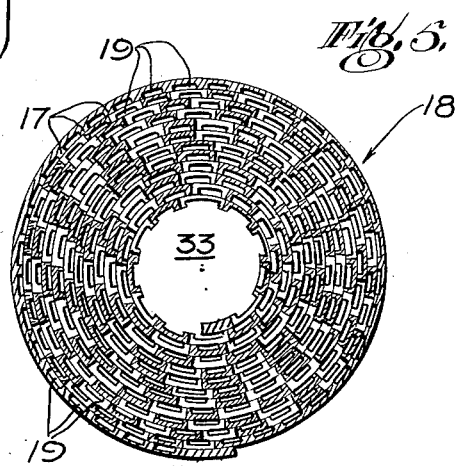
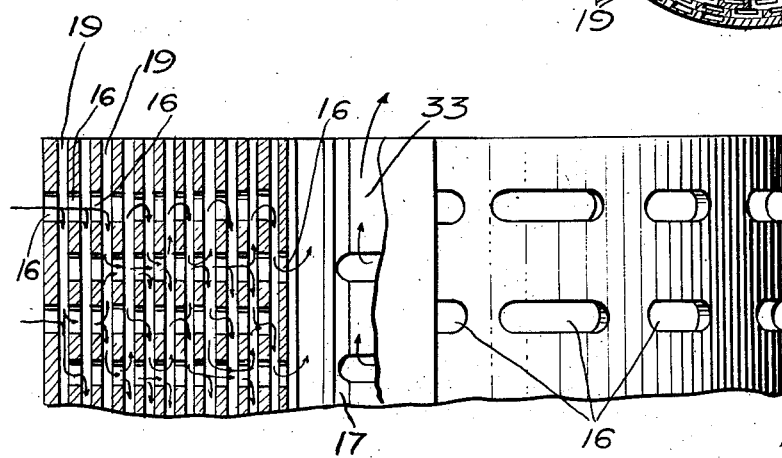
INVENTORS
Ralph R. Layte
Reuben Wolk
BY Kenyon & Kenyon
ATTORNEYS Dec. 17, 1957  R. R. LAYTE ET AL  2,816,665
WOUND FILTER ELEMENT Filed Aug. 16, 1954  3 Sheets-Sheet 2

INVENTORS
Ralph R. Layte
Reuben Wolk
BY
Kenyon & Kenyon
ATTORNEYS

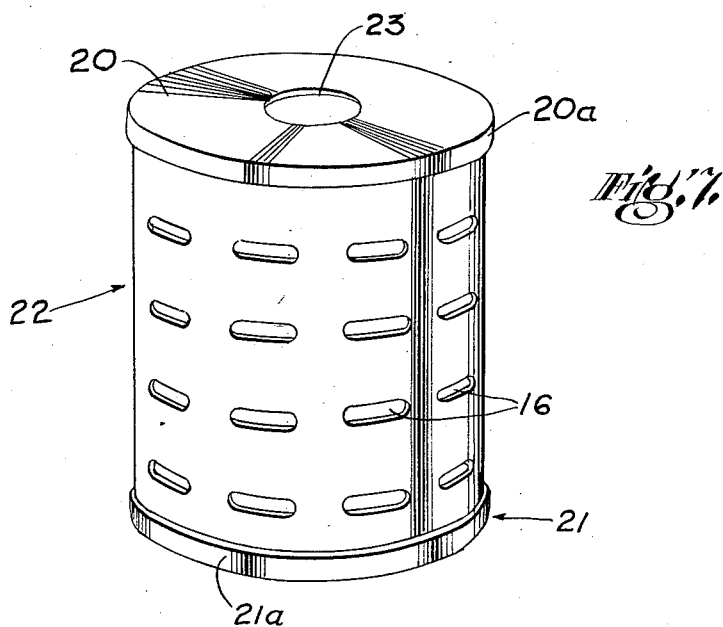
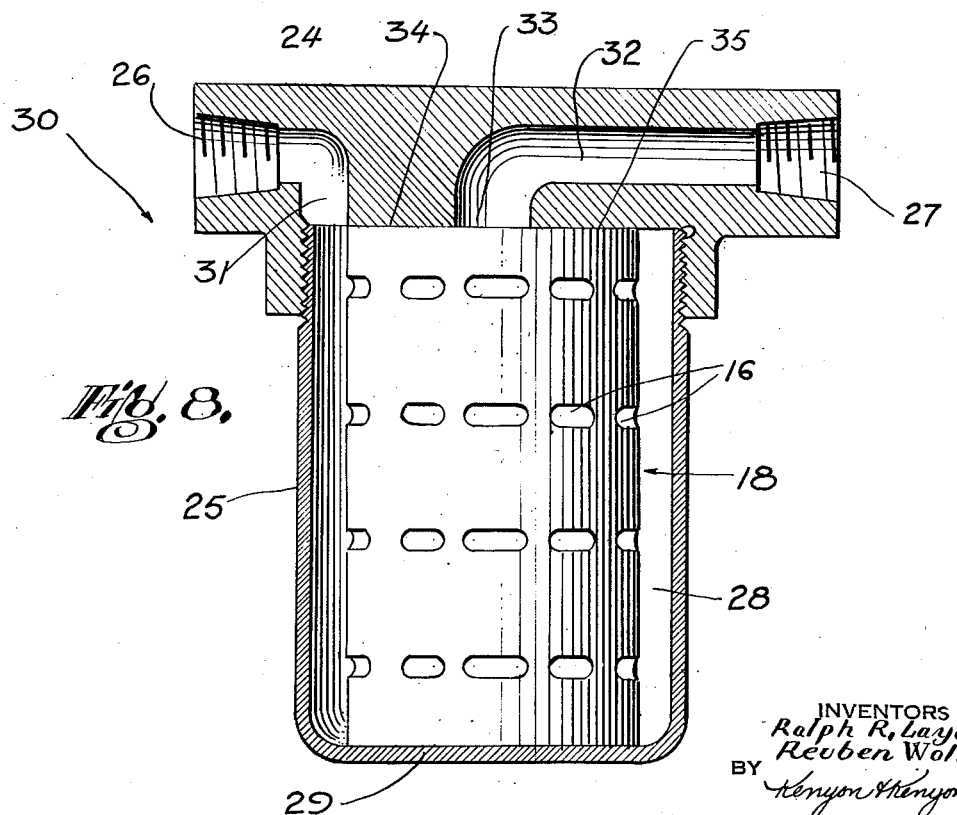

United States Patent Office 2,816,665
Patented Dec. 17, 1957

2,816,665
WOUND FILTER ELEMENT

Ralph R. Layte, Westfield, N. J., and Reuben Wolk, Levittown, Pa., assignors to Purolator Products, Inc., Rahway, N. J., a corporation of Delaware Application August 16, 1954, Serial No. 449,866

3 Claims. (Cl. 210—494)

This invention relates to improvements in filter elements for liquids.

It is a principal object of this invention to provide a metal edge type filter element of simplified design.

It is a further object to provide an element of this type that is self-supporting.

It is an additional object to provide an element of this type that may be easily cleaned for re-use.

A still further object is to provide an element that does not require additional structure for proper channelization of filtering flow through it.

A filter element made according to this invention comprises a flat sheet of thin metal in which parallel spacing ribs are provided, all preferably spanning one entire dimension of the sheet. A series of slots are provided in the sheet. These slots are disposed in parallel rows that run transversely of the direction of the ribs. The sheet is then wound spirally to form a cylinder in which the ribs run parallel with the axis of the cylinder, the ribs and the adjacent faces of turns being in contact and defining filtering interstices. The slots form passages between turns through which the liquid being filtered may pass radially through turns of the sheet until it reaches the filtering interstices. If it is desired to form a permanent element, the sheet may be coated with a fusible material, such as copper, as by electroplating or as by some other suitable method, either in its original form or after its formation. The rolled element may be temporarily tied, and then permanently fused by insertion into a brazing bath which will cause the ribs to become bonded to the turn surface portions of the sheet with which they are in contact.

Instead of permanently bonding the element, several collars or caps may be slipped over the wound body to hold its turns in position without brazing. When this is done, it is possible to remove the collars or caps at will and allow the winding to be slightly loosened, thus permitting the element to be cleaned as by washing or by use of an air hose.

Other objects and features of this invention will become apparent from the following specification and the accompanying drawings, in which:

Figure 4 is a perspective view of a completed filter element having over-all cylindrical shape;

Figure 5 is a sectional view taken along line 5—5 of Figure 4;

Figure 6 is a fragmentary sectional view taken along line 6—6 of Figure 4;

Figure 7 is a view similar to Figure 4, illustrating a different modification of the invention; and Figure 8 is a sectional view of an element embodying the invention mounted in a filter housing for use.

Figure 1:
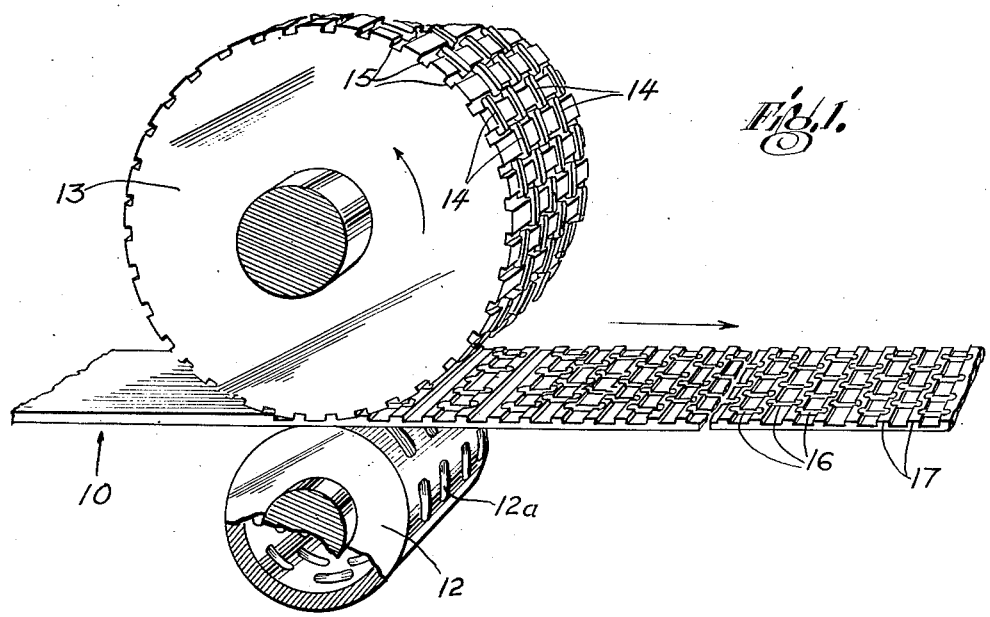
Figure 1 is a simplified perspective view of mechanism for preparing a sheet that is used in forming a filter element embodying the invention.

Referring now to the drawings, a flat, thin strip 10 is treated to produce the filter element of this invention. This strip is preferably of metal, such as steel or aluminum, but may also be a plastic, such as vinylidene chloride, vinyl chloride acetate, nylon (polymeric amide), plastic or poly-halogenated hydrocarbons. This strip 10 is utilized to form the sheet 11, shown in Figure 2, which generally has rectangular form, by processing in any of several known methods such as by punching or rolling.

Figure 2:
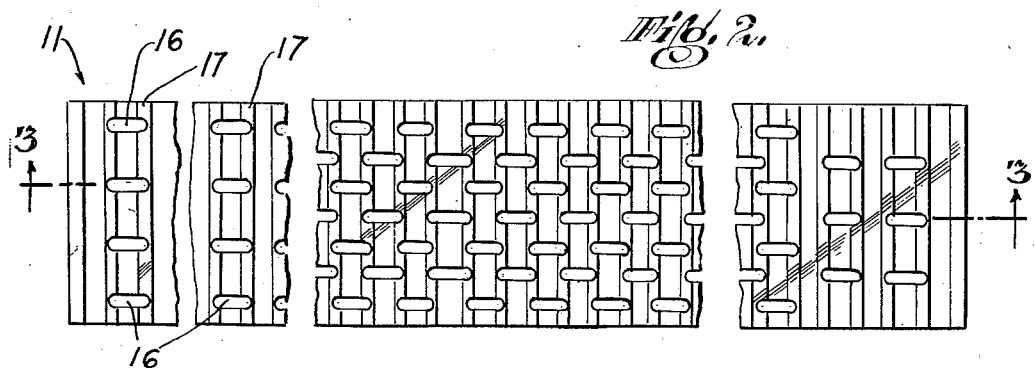
Figure 2 is an elevational view of a fabricated sheet before it is rolled or wound up.
Figure 3:
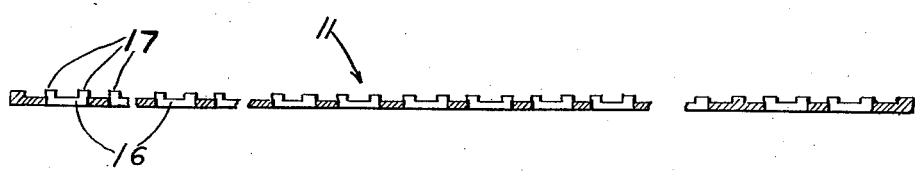
Figure 3 is a sectional view taken along line 3—3 of Figure 2.

One such process is illustrated diagrammatically in Figure 1. The strip 10 is passed between a roll 12 having punch holes 12a in its surface and a roll 13 on which are located a number of oval punches or hole forming members 14 and a number of grooves 15, the latter running parallel to the axis of the roll. The rolls 12 and 13 are geared for synchronous drive by appropriate means (not shown). As the strip 10 passes along between rolls 12 and 13 the holes, apertures or slots 16 are punched through the strip and ribs 17 are formed on one surface of said strip. The holes or apertures 16 have greater length than width and span the distance between adjacent ribs. Thereafter the strip is cut into sheets 11 of desired length. If desired, the sheets 11 may be cut to size before processing between the rolls 12 and 13. A finished sheet 11 is shown in Figures 2 and 3, and it is to be noted that the slots 16 are located in longitudinal rows or lines with their longer axes running parallel with the rows (horizontally of the sheet in this instance) while groups of slots 16 of the rows are arranged in vertical tiers. The ribs 17 lie parallel with the vertical or shorter end edges of the sheet 11.

At one end of the sheet, a few of the slots 17 in alternate vertical tiers have been omitted, while at the other end, a few slots 17 from the other alternate vertical tiers have been omitted, for reasons to be discussed presently. For example, at the right end of the sheet 11 slots in odd numbered tiers are omitted, while at the left end slots in even numbered tiers are omitted. This is provided for by appropriate omission of punch forming members 14 from the roll 13.

The sheet 11 as it appears in Figure 2 is then wound up spirally to form the element 18 shown in Figures 4 to 6. This winding is accomplished by temporarily attaching one end of sheet 11 to a mandrel (not shown) whose diameter is equal to the desired inside diameter of the element 18 and rotating the mandrel until the sheet 11 is completely wound up upon it. The adjacent sheet turns are spaced by the ribs 17 which define filtering interstices 19. A pair of temporary tie wires (not shown) is then wrapped around the element until the next step in the operations is carried out in order to maintain the fixed condition of the wound cylinder.

If it is desired to form a permanent element (i. e., permanently fix its turns), heat is applied to the element while bound by the temporary tie wires or stays by one of several well-known methods. For example, if the material of sheet 11 is steel coated with copper, element 18 is dipped into a brazing bath at a temperature of about 2000° F., causing the ribs 17 to adhere to the surfaces of the adjacent turns with which they are in contact. In the case of plastic sheet materials, an electric induction coil (not shown) is used to heat the material sufficiently to soften it and render it tacky, thus causing bonding of adjacent parts that are in contact before rehardening by cooling. Other methods known to the industry may be used to effect the bonding of the turn surfaces and ribs. After the bonded element is removed from the brazing bath, oven, or other bonding mechanism, the tie wires are removed.

If a cleanable filter element is desired, in which the turns are not to be permanently bonded, a different procedure is followed. In this case, a pair of end caps 20 and 21 (Figure 7) are mounted on the opposite ends of the wound sheet to form the element 22, shown in Figure 7. Here, again, spacing between turns is effected by the ribs of sheet 11. The lower cap 21 is a complete disc with upstanding rim 21a which closes off the bottom of element 22 while the upper cap 20 has an annular rim 20a and a central aperture 23, the latter being aligned with the longitudinal center hole of element 22 from which the core has been removed to permit exit flow of fluid from element 18. The specific design of the end caps 20 and 21 may be varied to suit the specific design involved. These caps will hold the spirally wound sheet 11 in shape, and after they are applied the temporary stays or tie wires (not shown) are removed and discarded. When an element 22 becomes clogged in use, it may be cleaned by removing the end caps 20 and 21 and dipping the element in or spraying it with a liquid solvent. Removal of the caps permits the turns to relax somewhat, thus facilitating this cleaning process. When it is desired to reassemble the element 22, the turns are tightened again and the end caps 20 and 21 slipped back on.

The elements 18 or 22 described above may be installed in filters of various designs. One such installation is shown in Figure 8. The filter 30 includes a housing head 24 and a housing body 25 which are fastened together as by a threaded joint. The head 24 includes an inlet 26 and an outlet 27. Element 18 of Figure 4 is mounted in the body 25, defining an annular space 28 between the outermost turn of the element and the inner surface of the body 25. The bottom of the element fits flush with the inner lower surface 29 of the body 25 to seal off the filtering interstices at the bottom of the element. The head 24 is so fabricated that inlet 26 is connected with a passage 31, which in turn opens into the annular space 28; the exit 27 is connected with a centralized passage 32 which opens into the hollow center 33 of the element 18. The upper end edges of the element are covered by the solid face portions 34 and 35 of the head 24 to prevent flow through the upper end apertures of the filtering interstices of element 18.

It should be understood that the element 22 of Figure 7 or any similar element, could be installed in the housing shown instead of element 18.

The operation of the device is as follows:

Liquid being filtered enters the inlet 26 of the filter 30 (Figure 8), flows through passage 31 and into annular space 28. The liquid will then be forced to pass radially into the exposed slots 16 (Figures 4, 5 and 6) because of the closure of the filter ends by the solid portions 34 and 35 of the filter head 24 and by the bottom 29. The liquid entering each slot 16 will split, as is best shown in Figure 6 some will flow vertically down the first interstice 19, the remainder will pass through the next slot 16 in the same row, then again split and flow down the next interstice 19 or through the next slot 16 in its row. This continues until the last slot is traversed. The liquid flowing into the interstice 19 is thus effectively filtered due to the restricted areas of these interstices, as best shown in Figure 5. The liquid, which is now clean, reaches the final or innermost tier of slots 16, which open to the center of the element, but is blocked from flowing back to the outer surface. It thus flows through these innermost slots and into the center hole 33 of the element, whence it flows into passage 32 and out of the filter via the outlet 27.

As appears from Figures 5 and 6, unless alternate slots 16 are omitted at end portions of the strip 11 the wound strip would permit direct radial flow through radially aligned slots 16 from the outside to the inside of the element 18 without effecting longitudinal flow through the interstices. Omission of some of the slots 16 as indicated forces flow longitudinally through interstices because no completely aligned radial sets of slots exist in the turns of the wound up element. Thus filtration by intersticial flow is effected.

It should be noted that the size and spacing of the slots 16 and ribs 17 may be varied to produce variations in fineness of filtration and in speed of flow. One factor must be carefully controlled; the slots 16 must be longer than the distance between the ribs 17, to avoid the possibility of having an entering slot blocked off from an exit slot by ribs, thus preventing free filtering flow of the liquid.

Further modifications in structure and methods of fabrication within the scope of the claims may be made without departing from the spirit of the invention.

What is claimed is:

1. A filter element for liquids comprising a substantially rectangular sheet of material provided with parallel spaced apart ribs on one face each extending the width of said sheet, a plurality of openings spanning the distances between adjacent pairs of ribs, said openings being arranged in groups with the openings of adjacent groups disposed in staggered relationships, said sheet being helically coiled upon itself into turns to form a cylinder whose axis is parallel with the ribs and with the ribs in each turn in contact with the non-ribbed face of the adjacent turn of the helically coiled sheet and thereby defining axially extending filtering interstices between adjacent turns, said groups of openings providing radially directed flow passages between succeeding adjacent turns but their staggered relationships precluding direct radial flow through all the turns and compelling a tortuous flow of fluid to be filtered by the element both axially and radially thereof respectively through the interstices defined between turns and the said staggered groups of openings.

2. A filter element for liquids comprising a substantially rectangular sheet of material provided with parallel spaced apart ribs on one face each extending the width of said sheet, a plurality of openings spanning the distances between adjacent pairs of ribs, said openings being arranged in groups with the openings of adjacent groups disposed in staggered relationships, said sheet being helically coiled upon itself into turns to form a cylinder whose axis is parallel with the ribs and with the ribs in each turn in contact with the unribbed face of the adjacent turn of the helically coiled sheet and thereby defining axially extending filtering interstices between adjacent turns, said ribs being permanently bonded to the unribbed face of the adjacent turn with which they are in contact, said groups of openings providing radially directed flow passages between succeeding adjacent turns but their staggered relationship precluding direct radial flow through all the turns and compelling a tortuous flow of fluid to be filtered by the element both axially and radially thereof respectively through the interstices and the said staggered groups of openings.

3. A filter element for liquids comprising a substantially rectangular sheet of material provided with parallel spaced apart ribs on one face each extending the width of said sheet, a plurality of openings spanning the distances between adjacent pairs of ribs, said openings being arranged in groups with the openings of adjacent groups disposed in staggered relationships, said sheet being helically coiled upon itself into turns to form a cylinder whose axis is parallel with the ribs and with the ribs in each turn in contact with the non-ribbed face of the adjacent turn of the helically coiled sheet and thereby defining axially extending filtering interstices between adjacent turns, said groups of openings providing radially directed flow passages between succeeding adjacent turns but their staggered relationship precluding direct radial flow through all the turns and compelling a tortuous flow of fluid to be filtered by the element both axially and radially thereof respectively through the interstices defined between turns and the said staggered openings and end caps mounted on the element to maintain the sheet in its helically coiled condition.

References Cited in the file of this patent

UNITED STATES PATENTS

| | | |
|---|---|---|
| 15,363 | Wickersham | July 15, 1856 |
| 1,639,133 | Greene | Aug. 16, 1927 |
| 1,792,797 | Armstrong | Feb. 17, 1931 |
| 1,965,172 | Cammen | July 3, 1934 |
| 2,141,903 | Brundage | Dec. 27, 1938 |
| 2,339,703 | Kamrath | Jan. 18, 1944 |
| 2,599,604 | Bauer et al. | June 10, 1952 |

FOREIGN PATENTS

| | | |
|---|---|---|
| 4,286 | Great Britain | Sept. 6, 1883 |
| 9,228 | Great Britain | Apr. 13, 1911 |
| 579,562 | Great Britain | Aug. 8, 1946 |
| 1,050,918 | France | Sept. 9, 1953 |